United States Patent [19]

Takei et al.

[11] Patent Number: 5,898,016
[45] Date of Patent: Apr. 27, 1999

[54] METALLIC SUPPORT CATALYST

[75] Inventors: Hisashi Takei, Shizuoka-ken; Toshihiro Takada, Susono; Kiyomi Iida, Nagoya, all of Japan

[73] Assignees: Cataler Industrial Co., Ltd.; Toyota Jidosha Kabushiki Kaisha

[21] Appl. No.: 08/561,389

[22] Filed: Nov. 21, 1995

[30] Foreign Application Priority Data

Nov. 22, 1994 [JP] Japan .................................. 6-288373
Nov. 21, 1995 [JP] Japan .................................. 7-302387

[51] Int. Cl.⁶ .............................. B01J 21/04; B01D 50/00
[52] U.S. Cl. ............... 502/527.14; 502/439; 502/527.16; 502/527.22; 422/177; 422/180
[58] Field of Search .................................. 502/527, 439, 502/527.14, 527.16; 422/177, 180, 527.14, 527.16, 527.22

[56] References Cited

U.S. PATENT DOCUMENTS

| | | | |
|---|---|---|---|
| 4,702,897 | 10/1987 | Onal | 423/213.5 |
| 4,987,034 | 1/1991 | Hitachi et al. | 502/527 |
| 5,374,402 | 12/1994 | Hitachi et al. | 422/180 |
| 5,455,012 | 10/1995 | Machida et al. | 422/180 |

FOREIGN PATENT DOCUMENTS

| | | |
|---|---|---|
| 0 232 793 | 8/1987 | European Pat. Off. . |
| 0 449 423 | 10/1991 | European Pat. Off. . |
| 0 635 627 | 1/1995 | European Pat. Off. . |
| A-53-149886 | 12/1978 | Japan . |
| A-60-5230 | 1/1985 | Japan . |
| A-63-143941 | 6/1988 | Japan . |

OTHER PUBLICATIONS

"Development of a Highly Heat–Resistant Metal Supported Catalyst,", Toshihiro Takada et al., SAE International Congress and Exposition, Detroit, Michigan, Feb. 25–Mar. 1991, SAE Technical Paper Series 910615, pp. 1–8.

*Primary Examiner*—Glenn A. Caldarola
*Assistant Examiner*—In Suk Bullock
*Attorney, Agent, or Firm*—Oliff & Berridge, PLC

[57] ABSTRACT

A metallic support catalyst includes a honeycomb body, an outer cylinder and a catalyst ingredient loading layer, and has a geometric surface area of 40 $cm^2/g$ or more with respect to its unit weight. The honeycomb body is formed of a flat metallic foil and a corrugated metallic foil, which are laminated and formed as a roll so as to form a plurality of honeycomb-shaped cells in the honeycomb body. The outer cylinder holds the honeycomb body therein. The catalyst ingredient loading layer is coated on the honeycomb-shaped cells of the honeycomb body. The honeycomb body can be formed of a flat metallic foil and a corrugated metallic foil, which have a thickness of from 0.02 to 0.04 mm. The catalyst ingredient loading layer can have a weight of from 60 to 150 g/liter with respect to a unit volume of said honeycomb body.

14 Claims, 3 Drawing Sheets

METALLIC SUPPORT CATALYST

BACKGROUND OF THE INVENTION

1. Field of the Invention

The present invention relates to a metallic support catalyst, which is adapted for purifying exhaust gases emitted from internal combustion engines, and which comprises a metallic honeycomb body, and a catalyst ingredient loaded on the metallic honeycomb body.

2. Description of Related Art

As automotive exhaust gas emission control becomes strict, automobiles are equipped with an exhaust gas purifying apparatus. The following methods are available for purifying automotive exhaust gases; namely: a thermal reactor method, a lean-burn method, an engine-modification method, and a catalyst method. Many automobiles employ a catalyst method.

As for an automotive exhaust-gas-purifying catalyst, a Pt, Pd, or Rh-based catalyst is used. An automotive exhaust-gas-purifying catalyst can be classified into granular one and monolithic one in terms of shape. Monolithic catalyst is made from either ceramics or metal. Ceramics catalyst is made by the following processes; namely: ceramics is calcinated into a honeycomb-shaped support. The support is accommodated in a metallic cylinder. A $\gamma$-$Al_2O_3$ powder with a catalyst ingredient (e.g., Pt, or the like) loaded is deposited on the support. The ceramics monolithic support catalyst is susceptible to mechanical shocks, and exhibits large resistance against exhaust gases. Accordingly, metallic monolithic support catalysts have recently come to be used widely in order to reduce pressure-loss in exhaust system and enhance the heat resistance of support.

For instance, a metallic monolithic catalyst is made as follows; namely: an Fe—Cr—Al stainless steel plate is rolled into a flat foil in a thickness of a few dozens of micrometers. The Fe—Cr—Al stainless steel plate, for example, includes Cr in an amount of 20% by weight, Al in an amount of 5% by weight, and the balance of Fe and inevitable impurities. Part of the resulting flat foil is formed into a corrugated foil. The flat foil and the corrugated foil are laminated alternately, or formed as a roll so as to prepare a honeycomb body. The honeycomb body is accommodated in a metallic cylinder to make a substrate. The substrate is coated with $\gamma$-$Al_2O_3$ to form a catalyst ingredient loading layer. Then, a catalyst ingredient, such as Pt, Rh, and Pd, is deposited on the loading layer.

In the metallic monolithic catalyst or metallic support catalyst, it has been required to improve the purifying characteristic immediately after starting engine (i.e., warm-up characteristic). A variety of attempts have been made so far. For example, in order to upgrade the warm-up characteristic of metallic support catalyst, it is effective to reduce the heat capacity of metallic support. Accordingly, the cell density of honeycomb body has been reduced, or the foil, forming metallic-honeycomb body, has been perforated. However, such attempts have decreased the geometric surface area of metallic honeycomb support.

On the other hand, in order to enhance the conversion of metallic support catalyst, it is effective to increase the geometric surface area of metallic support. Accordingly, the cell density of metallic support has been increased, or the foil, forming the metallic honeycomb support, has been provided with projections or is corrugated. However, such attempts have increased the heat capacity of metallic honeycomb support, and resulted in impairing the warm-up characteristic of metallic support catalyst.

Metallic support catalysts are required to exhibit good warm-up characteristic as well as high conversion. It is understood from the foregoing description that improving the warm-up characteristic results in reducing the conversion, and that enhancing the conversion results in deteriorating the warm-up characteristic. Thus, it is difficult to satisfy both of these characteristics at the same time.

SUMMARY OF THE INVENTION

The present invention has been developed in order to solve the problems associated with conventional metallic support catalysts. It is therefore an object of the present invention to provide a metallic support catalyst whose warm-up characteristic is improved without degrading the conversion of exhaust gases.

The inventors of the present invention noticed that the total weight of a honeycomb-shaped metallic support and a catalyst ingredient loading layer (hereinafter referred to as "catalyst weight") affects the warm-up characteristic. They also observed that the geometric surface area of a honeycomb-shaped metallic support influences the conversion. They take the catalyst weight and the geometric surface area (i.e., the factors determining the catalytic performance of metallic support catalyst) into consideration at the same time, and diligently made research the balance between the catalyst weight and the geometric surface area. Moreover, they also studied on the relationship between the warm-up characteristic and the conversion. As a result, they discovered that the warm-up characteristic of a metallic support catalyst can be secured and the purifying capability thereof can be effected maximally when the geometric surface area with respect to a unit weight of metallic support catalyst falls in a predetermined range. They thus completed the present invention.

In addition, the inventors of the present invention continuously made research on a thickness of a metallic foil, forming a metallic support, as well as a coating amount of a catalyst ingredient loading layer, both of which affect the warm-up characteristic and the conversion. As a result, they discovered that the warm-up characteristic of metallic support catalyst can be upgraded without degrading the purifying capability thereof when the thickness of a metallic foil falls in a predetermined thickness range and when the coating amount of a catalyst ingredient loading layer falls in a predetermined weight range. They thus completed the present invention.

A first embodiment of a metallic support catalyst according to the present invention comprises:

a honeycomb body including a flat metallic foil and a corrugated metallic foil, and having an outer peripheral surface, the flat metallic foil and the corrugated metallic foil being laminated and formed as a roll so as to form a plurality of honeycomb-shaped cells in the honeycomb body;

an outer cylinder for holding the honeycomb body therein, the outer cylinder disposed coaxially with the honeycomb body on the outer peripheral surface of the honeycomb body; and a catalyst ingredient loading layer coated on the honeycomb-shaped cells of the honeycomb body;

the metallic support catalyst having a geometric surface area of 40 $cm^2$/g or more with respect to its unit weight.

As earlier mentioned, the catalyst weight affects the warm-up characteristic of metallic support catalyst, and the geometric surface area influences the conversion thereof. Accordingly, in the first embodiment, the catalyst weight and the geometric surface area are optimized simultaneously. Hence, in the first embodiment, the metallic support catalyst has a geometric surface area of 40 cm$^2$/g or more with respect to its unit weight As a result, the first embodiment has a reliably good characteristic, and effects its purifying capability maximally. In order to further enhance the warm-up characteristic and to securely give structural durability to the honeycomb body, it is preferred that the metallic support catalyst has a geometric surface area of from 40 to 55 cm$^2$/g, further preferably from 40 to 52.5 cm$^2$/g with respect to its unit weight.

In the first embodiment, when the metallic support catalyst has a geometric surface area of less than 40 cm$^2$/g with respect to its unit weight, the warm-up characteristic deteriorates. When the metallic support catalyst has a geometric surface area of more than 55 cm$^2$/g with respect to its unit weight, the resulting metallic support catalyst exhibits an increasing pressure loss. In addition, when the metallic support catalyst has a geometric surface area of more than 55 cm$^2$/g with respect to its unit weight, the thickness of the flat and corrugated metallic foils, constituting the honeycomb body, is 0.02 mm or less, and consequently the durability of the resulting honeycomb body deteriorates.

In the first embodiment, the catalyst ingredient loading layer can have a weight of from 0.06 to 0.3 g/c.c. with respect to a unit volume of the honeycomb body. In other words, the catalyst ingredient loading layer can be coated in an amount of from 0.06 to 0.3 g/c.c., preferably from 0.1 to 0.3 g/c.c., with respect to a unit volume of the honeycomb body. When the catalyst ingredient loading layer has a weight of less than 0.06 g/c.c. with respect to a unit volume of the honeycomb body, the resulting metallic support catalyst exhibits decreasing conversion. When the catalyst ingredient loading layer has a weight of more than 0.3 g/c.c. with respect to a unit volume of the honeycomb body, the resulting metallic support catalyst has a deteriorating warm-up characteristic.

In the first embodiment, the flat metallic foil and the corrugated metallic foil, which constitute the honeycomb body, can have a thickness of from 0.02 to 0.04 mm, further preferably from 0.025 to 0.035 mm. When the flat metallic foil and the corrugated metallic foil have a thickness of less than 0.02 mm, the resulting honeycomb body does not have satisfactory heat resistance, and is not reliable structurally. When the flat metallic foil and the corrugated metallic foil have a thickness of more than 0.04 mm, the resulting metallic support catalyst exhibits warm-up characteristic, which is adversely affected by the flat and corrugated metallic foils of heavy thickness.

In the first embodiment, the honeycomb body can have the honeycomb-shaped cells in a cell density of from 200 to 600 cells/in$^2$, further preferably from 300 to 400 cells/in$^2$. When the honeycomb body has the honeycomb-shaped cells in a cell density of less than 200 cells/in$^2$, the resulting metallic support catalyst does not have a desired geometric surface area. When the honeycomb body has the honeycomb-shaped cells in a cell density of more than 600 cells/in$^2$, the resulting metallic support catalyst exhibits an increasing pressure loss. In addition, when the honeycomb body has the honeycomb-shaped cells in a cell density of more than 600 cells/in$^2$, and simultaneously when the resulting metallic support catalyst should securely have a geometric surface area of 40 cm$^2$/g or more with respect to its unit weight, the thickness of the flat and corrugated metallic foils, constituting the honeycomb body, is 0.02 mm or less, and consequently the durability of the resulting honeycomb body deteriorates.

A second embodiment of a metallic support catalyst according to the present invention comprises:

a honeycomb body including a flat metallic foil and a corrugated metallic foil, and having an outer peripheral surface, the flat metallic foil and the corrugated metallic foil being laminated and formed as a roll so as to form a plurality of honeycomb-shaped cells in the honeycomb body, the flat metallic foil and the corrugated metallic foil having a thickness of from 0.02 to 0.04 mm;

an outer cylinder for holding the honeycomb body therein, the outer cylinder disposed coaxially with the honeycomb body on the outer peripheral surface of the honeycomb body; and a catalyst ingredient loading layer coated on the honeycomb-shaped cells of the honeycomb body, and having a weight of from 60 to 150 g/liter with respect to a unit volume of the honeycomb body.

In the second embodiment, the flat metallic foil and the corrugated metallic foil, which constitute the honeycomb body, have a thickness of from 0.02 to 0.04 mm, further preferably from 0.025 to 0.035 mm. Moreover, the catalyst ingredient loading layer is coated on the honeycomb-shaped cells of the honeycomb body in a weight of from 60 to 150 g/liter, further preferably from 80 to 150 g/liter, with respect to a unit volume of the honeycomb body. As a result, the metallic support catalyst securely shows a sufficient warm-up characteristic, and can effect its purifying capability maximally.

In the second embodiment, when the flat metallic foil and the corrugated metallic foil have a thickness of less than 0.02 mm, the resulting honeycomb body does not have satisfactory heal resistance, and is not reliable structurally. When the flat metallic foil and the corrugated metallic foil have a thickness of more than 0.04 mm, the resulting honeycomb body exhibits warm-up characteristic, which is adversely affected by the flat and corrugated metallic foils of heavy thickness.

In the second embodiment, when the catalyst ingredient loading layer is coated on the honeycomb-shaped cells of the honeycomb body in a weight of less than 60 g/liter with respect to a unit volume of the honeycomb body, the resulting metallic support catalyst shows decreasing conversion. When the catalyst ingredient loading layer is coated on the honeycomb-shaped cells of the honeycomb body in a weight of more than 150 g/liter with respect to a unit volume of the honeycomb body, the resulting metallic support catalyst exhibits deteriorating warm-up characteristic.

In the second embodiment, it is preferred to use an Fe—Cr—Al—based alloy, which exhibits good tensile strength at elevated temperatures, e.g. 8 kgf/mm$^2$ or more at 800° C., and 3.5 kgf/mm$^2$ or more at 900° C., for the flat metallic foil and the corrugated metallic foil. When an Fe—Cr—Al—based alloy, whose tensile strength is inferior to that of the preferred Fe—Cr—Al—based alloy, the flat metallic foil and the corrugated metallic foil fail to exhibit required tensile strength at elevated temperatures, and the resulting honeycomb body is not durable structurally. Note that the Fe—Cr—Al—based alloy preferably comprises Cr in an amount of from 10 to 40% by weight, Al in an amount of from 3 to 20% by weight, and the balance of Fe and inevitable impurities.

In the second embodiment, it is preferred to use an Fe—Cr—Al—based alloy, which exhibits good oxidation resistance, for the flat metallic foil and the corrugated metallic foil. For instance, when the preferred Fe—Cr—Al—based alloy is heated at 1,100° C. for 300 hours, it hardly suffers from abnormal oxidation. When an Fe—Cr—Al—based alloy, whose oxidation resistance is inferior to that of the preferred Fe—Cr—Al—based alloy, the flat metallic foil and the corrugated metallic foil fail to make a structurally-durable honeycomb body .

As having been described so far, in accordance with the first and second embodiments of the present invention, the metallic support catalyst shows reliably good warm-up characteristic, and at the same time can effect its purifying capability maximally.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and are not intended to limit the scope of the appended claims.

FIRST PREFERRED EMBODIMENT

Figure 1:
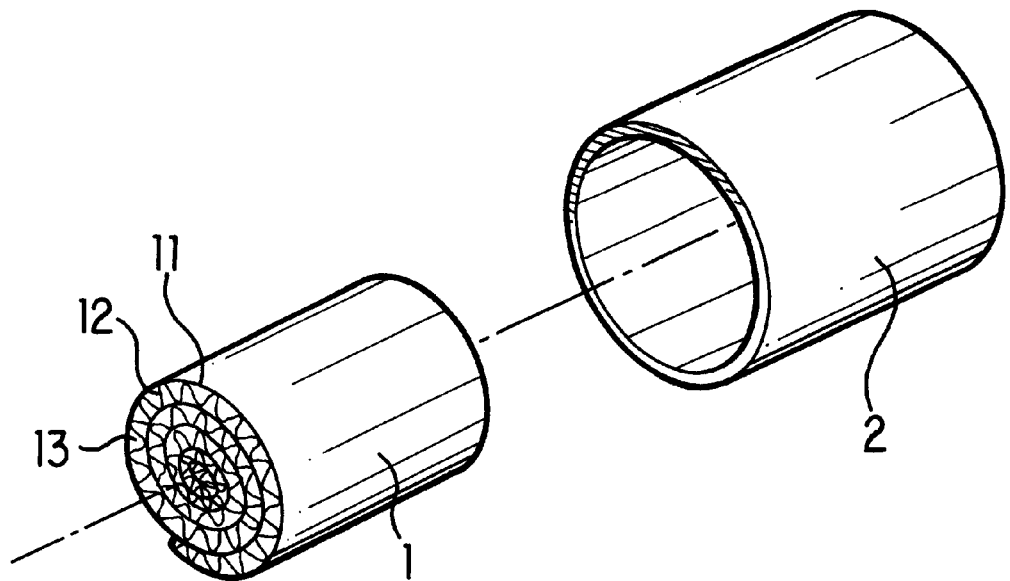
FIG. 1 is a perspective view of a First Preferred Embodiment of a metallic support catalyst according to the present invention.

As illustrated in FIG. 1, a First Preferred Embodiment of a metallic support catalyst according to the present invention comprises a honeycomb body 1, and an outer cylinder 2. The honeycomb body 1 includes a flat metallic foil 11 and a corrugated metallic foil 12, which are laminated and formed as a roll so as to form a plurality of honeycomb-shaped cells 13 in the honeycomb body 1. The outer cylinder 2 holds the honeycomb body 2 therein, and is disposed coaxially with the honeycomb body 1.

Figure 2:
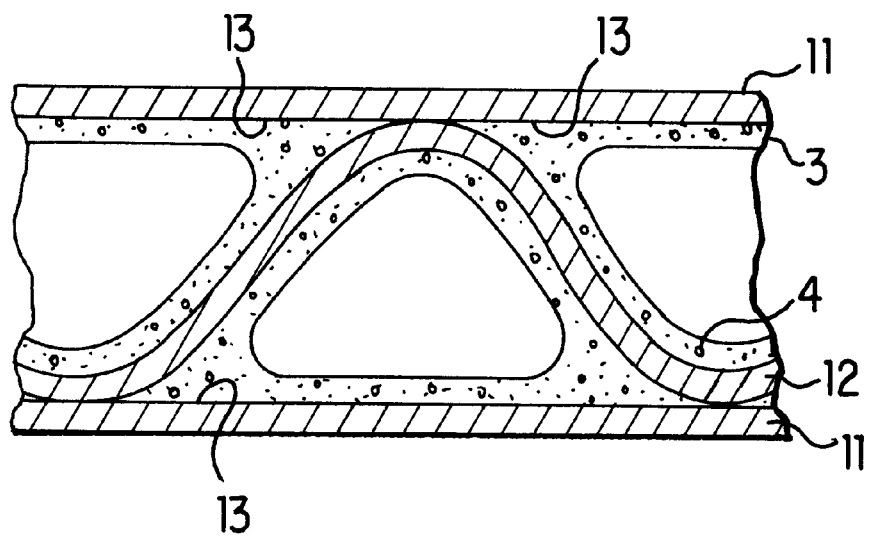
FIG. 2 is an enlarged partial cross-sectional view of FIG. 1.

As illustrated in FIG. 2, a catalyst ingredient loading layer 3 is coated on the honeycomb-shaped cells 13 of the honeycomb body 1. A plurality of noble-metal-catalyst-ingredient particles 4 are loaded on the catalyst ingredient loading layer 3.

In the First Preferred Embodiment, the flat metallic foil 11 and the corrugated metallic foil 12 were formed of an Fe—Cr—Al stainless steel foil, which was made by rolling in a thickness of from 0.02 to 0.04 mm. For example, the Fe—Cr—Al stainless steel foil comprised 20% by weight of Cr, 5% by weight of Al, and the balance of Fe and inevitable impurities, and was formed into the flat metallic foil 11 and the corrugated metallic foil 12. The flat metallic foil 11 and the corrugated metallic foil 12 were laminated alternately, and rolled into the honeycomb body 1. The honeycomb body 1 had a plurality of cells 13 in a cell density of from 200 to 600 cells/in$^2$. The thus prepared honeycomb body 1 was accommodated in the outer cylinder 2, which was formed of metal, thereby preparing a metallic support. Finally, $\gamma$-$Al_2O_3$ was coated on the cells 13 of the honeycomb body 1, and particles of noble metal catalyst ingredient were loaded on the catalyst ingredient loading layer 3, thereby forming the catalyst ingredient loading layer 3 with the noble-metal-catalyst-ingredient particles 4 loaded thereon. the noble metal catalyst ingredient was at least one element selected from the group consisting of Pt, Rh and Pd. Thus, a plurality of metallic support catalysts were prepared, which had a geometric surface area with respect to a unit weight of a metallic support catalyst (hereinafter abbreviated to "GSA/Catalyst-Weight") as illustrated in FIG. 3.

Figure 3:
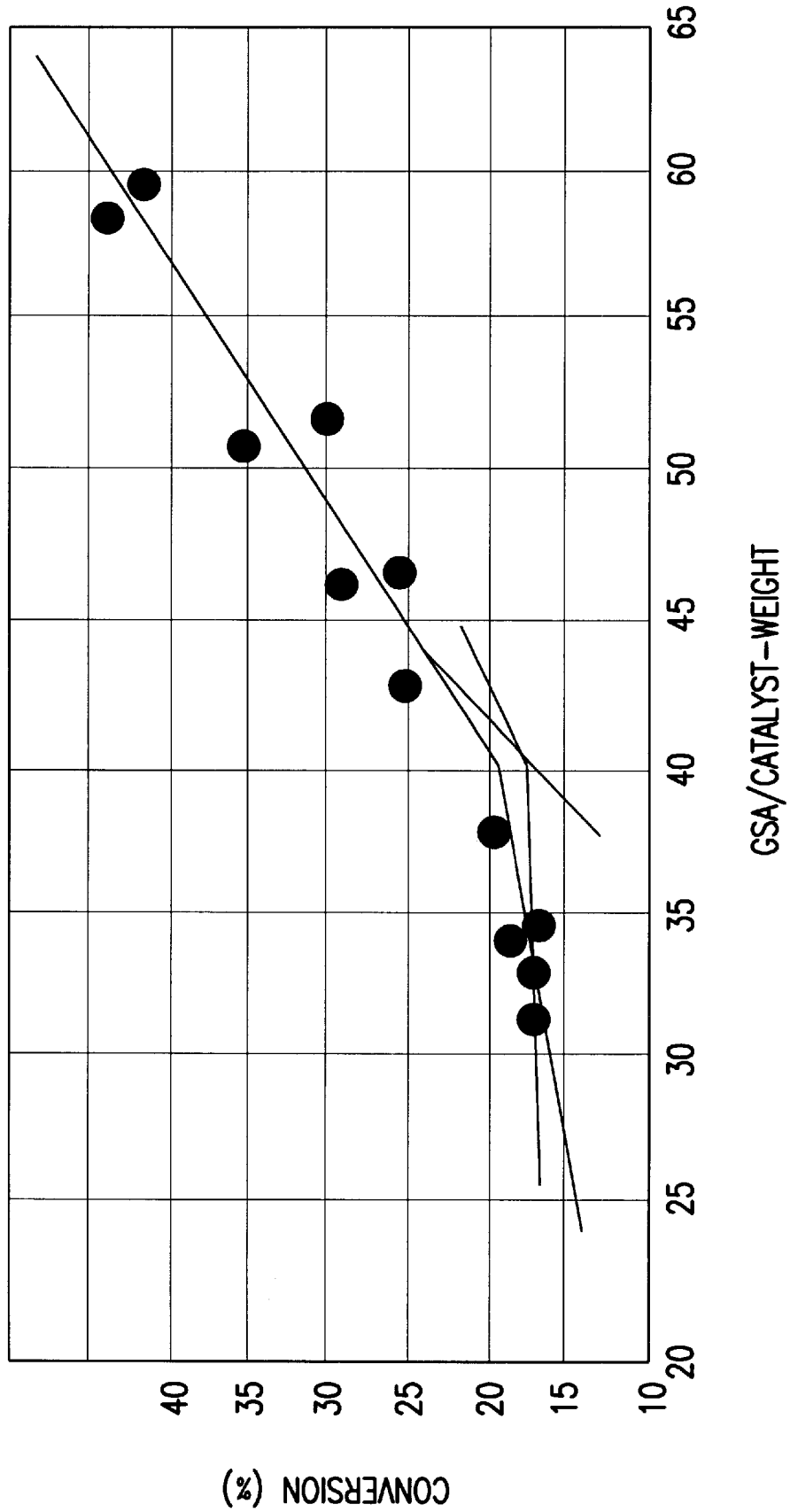
FIG. 3 is a characteristic curve, exhibited by the First Preferred Embodiment, for illustrating a relationship between the geometric surface area with respect to a unit weight of metallic support catalysts and the initial conversion thereof.

The resulting metallic support catalysts were examined for their initial conversions, and were found to exhibit the initial conversion characteristic as illustrated in FIG. 3. The term "initial conversion" herein means conversions which were exhibited by the metallic support catalysts at 20 minutes after starting up an engine. As can be appreciated from FIG. 3, the metallic support catalysts exhibited low initial conversion of about 17.5% when they had a GSA/Catalyst-Weight of less than 40 cm$^2$/g. The metallic catalyst supports exhibited good initial conversion of from 20 to 35% when they had a GSA/Catalyst-Weight of 40 cm$^2$/g or more. Thus, the metallic support catalysts, which had a GSA/Catalyst-Weight of 40 cm$^2$/g or more, verified the advantages produced by the present invention. Thus, the metallic support catalysts exhibited excellent warm-up characteristic when they had a GSA/Catalyst-Weight of 40 cm$^2$/g or more.

Moreover, the metallic support catalysts, which had a GSA/Catalyst-Weight of from 40 to 65 cm$^2$/g were examined for their ordinary conversions, and were found to keep exhibiting high conversions. In addition, in terms of the structural durability, the metallic support catalysts were found to be good when they had a GSA/Catalyst-Weight of from 40 to 55 cm$^2$/g, especially from 40 to 52.5 cm$^2$/g.

SECOND PREFERRED EMBODIMENT

A Second Preferred Embodiment of a metallic support catalyst according to the present invention has the same construction as that of the First Preferred Embodiment illustrated in FIGS. 1 and 2. However, in the Second Preferred Embodiment, the honeycomb body 1 had a plurality of cells 13 in a cell density of 400 cells/in$^2$, and $\gamma$-$Al_2O_3$ was coated on the cells 13 of the honeycomb body 1 in an amount of from 60 to 180 grams with respect to 1 liter of the honeycomb body 1. Note that, in the Second Preferred Embodiment, the flat metallic foil 11 and the corrugated metallic foils 12 were formed of Fe—Cr—Al stainless steel foils having a thickness, which fell in a range of from 0.015 to 0.05 mm.

Figure 4:
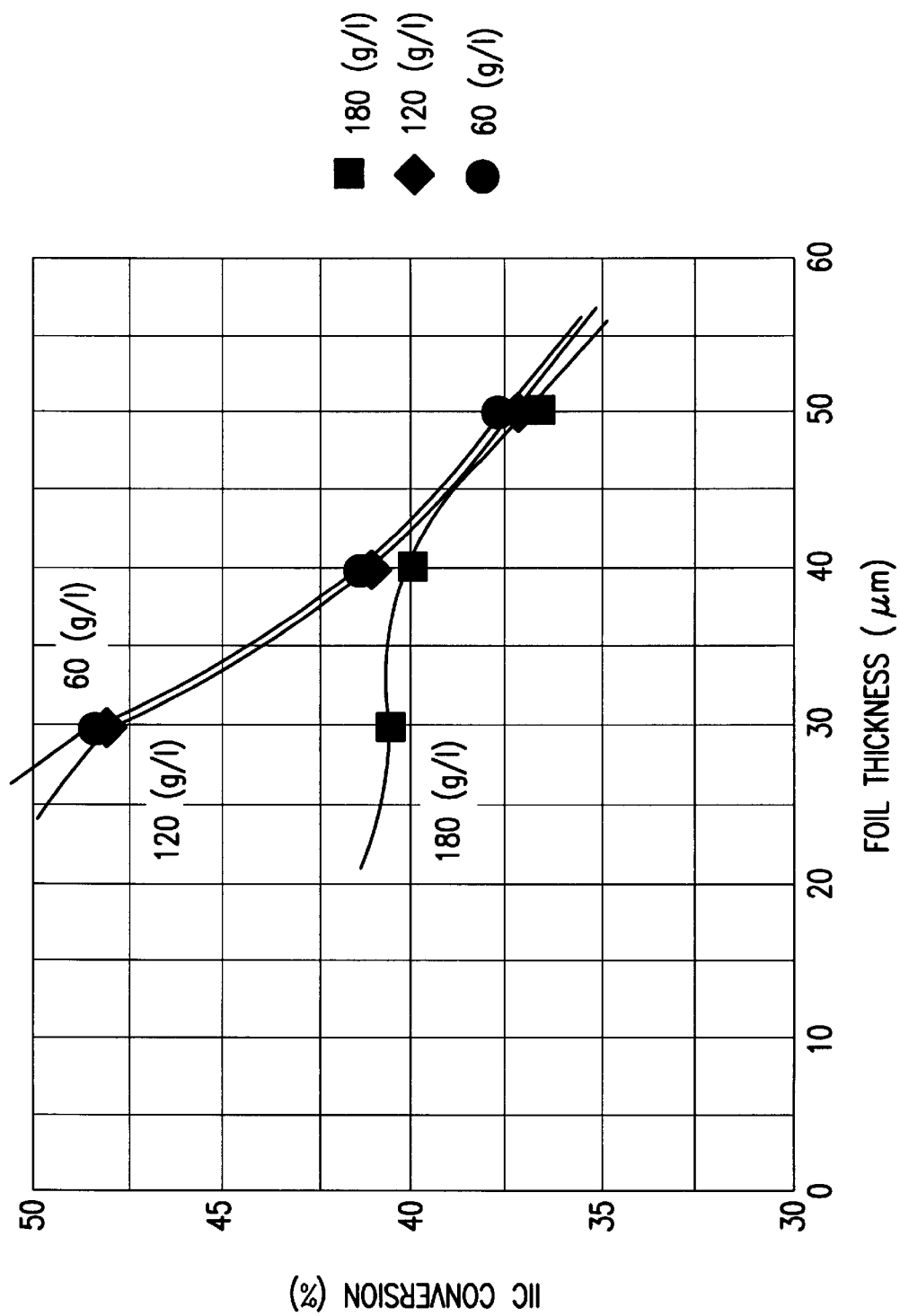
FIG. 4 is a characteristic curve, exhibited by a Second Preferred Embodiment of a metallic support catalyst according to the present invention, for illustrating a relationship between the metallic foil thickness of honeycomb bodies and the initial 11C conversion of metallic support catalysts.

The resulting metallic support catalysts were examined for their initial conversions, and were found to exhibit the initial HC conversion characteristic as illustrated in FIG. 4. As can be understood from FIG. 4, the metallic support catalysts were verified to exhibit geld initial conversion when the stainless steel foil, forming the honeycomb body 1, had a thickness of from 0.02 to 0.04 mm (i.e., from 20 to 40 $\mu$m), and when the catalyst ingredient loading layer 3 was coated in an amount of from 60 to 150 grams with respect to 1 liter of the honeycomb body 1. Thus, the metallic support catalysts, which satisfied these requirements, verified the advantages produced by the present invention. Moreover, the metallic support catalysts, which satisfied the requirements, were examined for their ordinary conversions, and were found to continuously exhibit high conversions.

Having now fully described the present invention, it will be apparent to one of ordinary skill in the art that many changes and modifications can be made thereto without departing from the spirit or scope of the present invention as set forth herein including the appended claims.

What is claimed is:

1. A metallic support catalyst, comprising:
    a honeycomb body including a flat metallic foil and a corrugated metallic foil, and having an outer peripheral surface, the flat metallic foil and the corrugated metallic foil being laminated and formed as a roll so as to form a plurality of honeycomb-shaped cells in the honeycomb body;
    an outer cylinder for holding said honeycomb body therein, the outer cylinder disposed coaxially with said honeycomb body on the outer peripheral surface of said honeycomb body; and
    a catalyst ingredient loading layer coated on the honeycomb-shaped cells of said honeycomb body;
    the metallic support catalyst having a geometric surface area of 40 $cm^2/g$ or more within respect to its unit weight.

2. The metallic support catalyst according to claim 1 having a geometric surface area which falls in a range of from 40 to 55 $cm^2/g$ with respect to its unit weight.

3. The metallic support catalyst according to claim 2, wherein said catalyst ingredient loading layer has a weight of from 0.06 to 0.3 g/c.c. with respect to a unit volume of said honeycomb body.

4. The metallic support catalyst according to claim 2, wherein the flat metallic foil and the corrugated metallic foil have a thickness of from 0.02 to 0.04 mm.

5. The metallic support catalyst according to claim 2, wherein said honeycomb body has the honeycomb-shaped cells in a cell density of from 200 to 600 cells/$in^2$.

6. The metallic support catalyst according to claim 1, wherein said catalyst ingredient loading layer has a weight of from 0.06 to 0.3 g/c.c. with respect to a unit volume of said honeycomb body.

7. The metallic support catalyst according to claim 6, wherein the flat metallic foil and the corrugated metallic foil have a thickness of from 0.02 to 0.04 mm.

8. The metallic support catalyst according to claim 6, wherein said honeycomb body has the honeycomb-shaped cells in a cell density of from 200 to 600 cells/$in^2$.

9. The metallic support catalyst according to claim 1, wherein the flat metallic foil and the corrugated metallic foil have a thickness of from 0.02 to 0.04 mm.

10. The metallic support catalyst according to claim 9, wherein said honeycomb body has the honeycomb-shaped cells in a cell density of from 200 to 600 cells/$in^2$.

11. The metallic support catalyst according to claim 1, wherein said honeycomb body has the honeycomb-shaped cells in a cell density of from 200 to 600 cells/$in^2$.

12. A metallic support catalyst, comprising:
    a honeycomb body including a flat metallic foil and a corrugated metallic foil, and having an outer peripheral surface, the flat metallic foil and the corrugated metallic foil being laminated and formed as a roll so as to form a plurality of honeycomb-shaped cells in the honeycomb body, the flat metallic foil and the corrugated metallic foil having a thickness of from 0.02 to 0.04 mm;
    an outer cylinder for holding said honeycomb body therein, the outer cylinder disposed coaxially with said honeycomb body on the outer peripheral surface of said honeycomb body; and
    a catalyst ingredient loading layer coated on the honeycomb-shaped cells of said honeycomb body, and having a weight of from 60 to 150 g/liter with respect to a unit volume of said honeycomb body; the metallic support catalyst having a geometric surface area of 40 $cm^2/g$ or more with respect to its unit weight.

13. The metallic support catalyst according to claim 12 having a geometric surface area of from 40 to 55 $cm^2/g$ with respect to its unit weight.

14. The metallic support catalyst according to claim 12, wherein said honeycomb body has the honeycomb-shaped cells in a cell density of from 200 to 600 cells/$in^2$.

* * * * *